United States Patent

[11] 3,631,485

[72] Inventor Harry L. Beazell, Jr.
South Bend, Ind.
[21] Appl. No. 200,224
[22] Filed June 5, 1962
[45] Patented Dec. 28, 1971
[73] Assignee Bendix Corporation
Mishawaka, Ind.

[54] GUIDANCE SYSTEM
4 Claims, 4 Drawing Figs.

[52] U.S. Cl..................................................... 343/7 ED,
244/3.13, 244/3.14, 244/3.19, 343/6 R, 343/7 A
[51] Int. Cl...................................................... G01s 9/02,
F41g 7/00
[50] Field of Search........................................... 244/14,
3.13, 3.14, 3.19; 343/7, 5, 8, 7.5, 7.6, 7 ED, 7 A, 6

[56] References Cited
UNITED STATES PATENTS

| | | | |
|---|---|---|---|
| 3,008,668 | 11/1961 | Darlington.................... | 343/7 |
| 3,074,062 | 2/1963 | Alpers........................... | 343/7 |
| 3,212,083 | 10/1965 | Hinchman..................... | 343/7 ED X |
| 3,363,858 | 1/1968 | Dobbins et al................ | 244/3.14 |

*Primary Examiner*—T. H. Tubbesing
*Attorneys*—Leo H. McCormick, Jr. and William N. Antonis CLAIM: 2. In a guidance system for a missile, said system including an illuminating radar and its antenna and said missile including pitch and yaw control devices, a rear antenna and a front scanning antenna;

said illuminating radar including means for generating a high-frequency reference signal, means for generating a second signal of lower frequency, a mixer for combining said second and said reference signals to produce a target-illuminating signal, means for receiving and amplifying both of said reference and illuminating signals and for connecting said amplified signals to said illuminating antenna;

said missile including a first band-pass filter connected to said rear antenna adapted to pass a band of frequencies including the frequency of said reference signal as modified by the Doppler effect caused by the velocity of said missile and to discriminate against said target-illuminating signal;

a second band-pass filter connected to said front scanning antenna adapted to pass a band of frequencies including the frequency of said target illuminating signal as modified by the Doppler effect caused by the velocity of said missile and said target and to discriminate against the band of frequencies passed by said first band-pass filter;

means operatively connected to said scanning antenna for imposing a modulation signal on the signal received by said scanning antenna, said modulation signal varying in phase depending upon the position of said target;

mixing and filtering means connected to said band-pass filters for producing a modulated intermediate frequency signal;

means for detecting and amplifying said modulated signal;

means producing an alternating current signal in phase with the movement of said scanning antenna;

and phase-responsive means for comparing said modulated signal with said alternating current signal for controlling the operation of said pitch and yaw control devices.

Patented Dec. 28, 1971

INVENTOR.
HARRY L. BEAZELL, JR.
BY
Robert C. Smith
ATTORNEYS

GUIDANCE SYSTEM

This invention relates to a guidance system for missiles and more particularly to a system having special utility for low cost missiles designed to operate over a limited range.

Comparatively elaborate guidance systems have been designed for ground-to-air and for ship-to-air installations, but cost and weight limitations make it somewhat more difficult to provide a missile system for the protection of small ships such as destroyer escorts, minesweepers, landing ships and auxiliary fleet vessels. In formulating the requirements for one such system it was considered that a maximum range of the order of 5 to 7 miles for single targets only, would be adequate. It is therefore an object of the present invention to provide a simplified guidance system for a missile which will achieve a reasonable kill probability at a distance sufficient to provide protection from attacking aircraft.

It is another object of the present invention to provide a guidance system meeting the above requirement and which requires no maintenance or testing aboard ship.

It is another object of the present invention to provide a guidance system which requires a minimum of warmup time prior to launch.

It is a further object of the present invention to provide a simplified guidance system for a missile which operates satisfactorily in the presence of ground or sea clutter.

It is a further object of the present invention to provide a missile guidance system meeting the above objectives in which the weight and cost of components carried on the missile itself are at a minimum and costs and accuracy specifications of the equipment at the launching site are reasonable.

Other objects and advantages will become apparent from the following specification taken in connection with the accompanying drawings in which.

Figure 1:
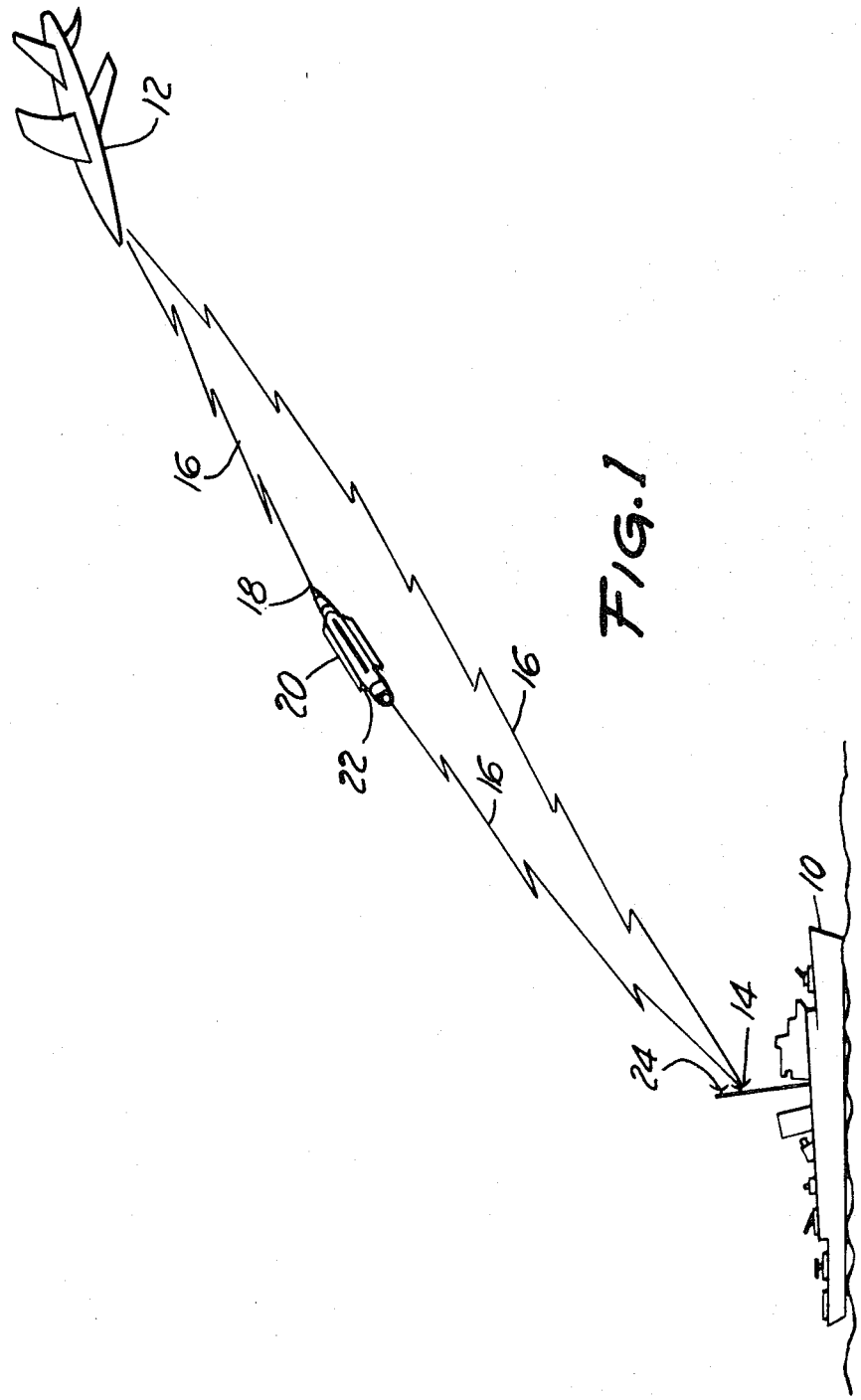
FIG. 1 is a drawing showing a typical application of my guidance system.

Referring to FIG. 1, a small ship 10 of the type referred to above is shown as under attack by an aircraft 12. The ship carries a radar-transmitting antenna 14 which radiates a continuous wave signal 16 which illuminates and is reflected by the aircraft 12 and is received at a conical scanning antenna 18 at the front of the missile 20. The missile also carries a rear antenna 22 which receives the continuous wave signal 16. Inasmuch as the missile 20 does not broadcast any guidance signal, it will be apparent that a semiactive homing system is utilized. The ship also carries a tracking radar system including an antenna 24 which is coordinated with the guidance system. The tracking radar system will not be described in detail because it is conventional. Its function, as will be apparent to those skilled in this art, is to locate the target and compute its range, velocity, azimuth, etc. such that the target may be selected and illuminated by the illuminating antenna 14.

Figure 2:
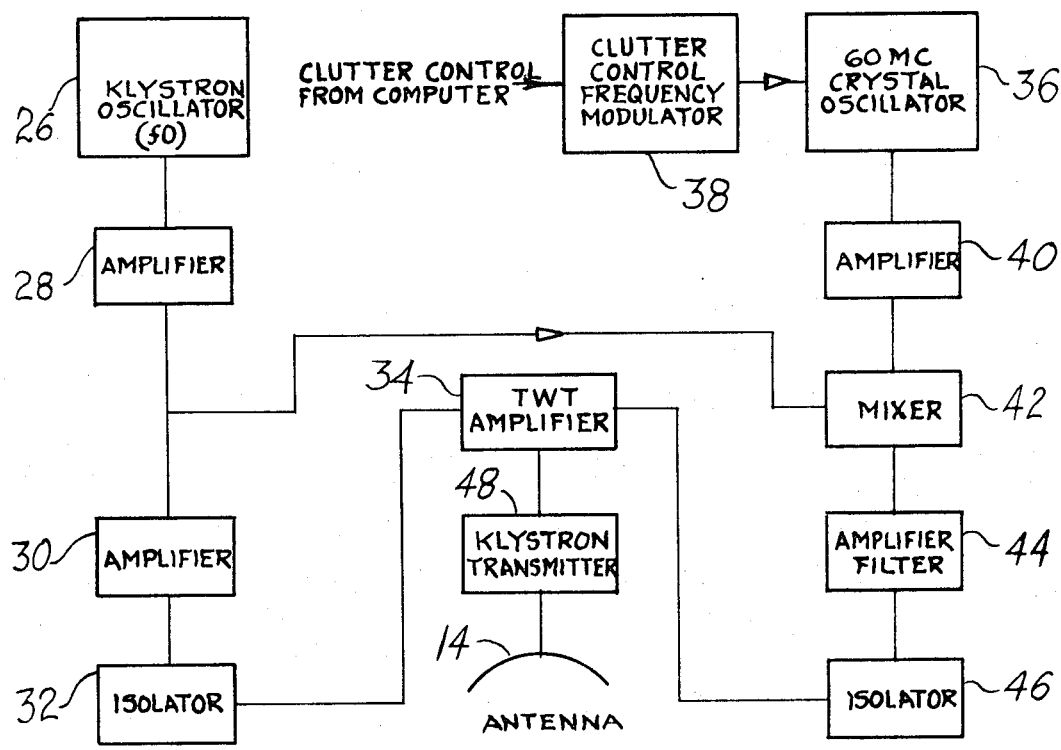
FIG. 2 is a block diagram of the part of the system carried aboard the ship or located at the launching site.

The illuminating radar which is carried on the ship 10 is shown in block diagram in FIG. 2. The target illuminator transmits two CW frequencies which illuminate the target and provide a reference signal for the semiactive seeker in the missile. The primary or reference frequency ($f_o$) of the system, which may be of the order of 10,000 megacycles, is generated by means of a klystron oscillator 26. This signal is amplified in an amplifier 28, further amplified in an amplifier 30, and fed through an isolator 32, which may be a ferrite isolator of the type known in the art, to a broadband travelling wave tube amplifier driver 34. A 60 mc. signal is generated in a crystal controlled oscillator 36. This signal ($\delta f$) may be varied over a 10 kc. range by means of a reactance tube circuit forming the principal part of a clutter control frequency modulator 38. The details of the generation of voltages proportional to the above named variables is well known in the fire control art and forms no part of the present invention other than as a means of providing a voltage to vary the output frequency of oscillator 36. From available target range and angle and preprogrammed missile speed and flight path data, an expected target and clutter frequency spectrum as seen by the missile, is known. A voltage is generated to control the frequency ($\delta f$) by the clutter control modulator 38 such that clutter return will not affect missile steering.

This oscillator signal is amplified in an amplifier 40 and is then supplied to a mixer 42 where it is mixed with the primary frequency output of amplifier 28 to obtain the illuminator signal. This illuminator signal is amplified and filtered to remove the undesired frequencies in an amplifier-filter 44. After being fed through an isolator 46 it is added to the reference signal from isolator 32 in the travelling-wave tube amplifier 34. These combined reference and illuminator signals drive an output klystron transmitter 48 which feeds the illuminator antenna 14.

Figure 3:
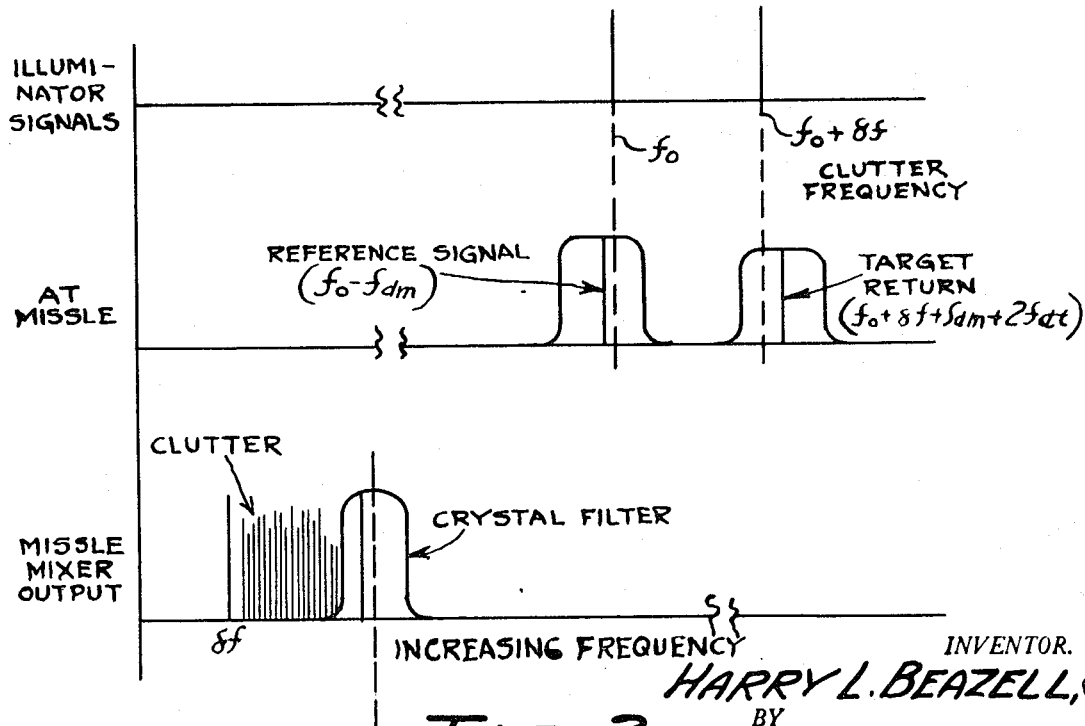
FIG. 3 is a series of graphs showing the frequency spectrum for the two frequency illuminator system.
Figure 4:
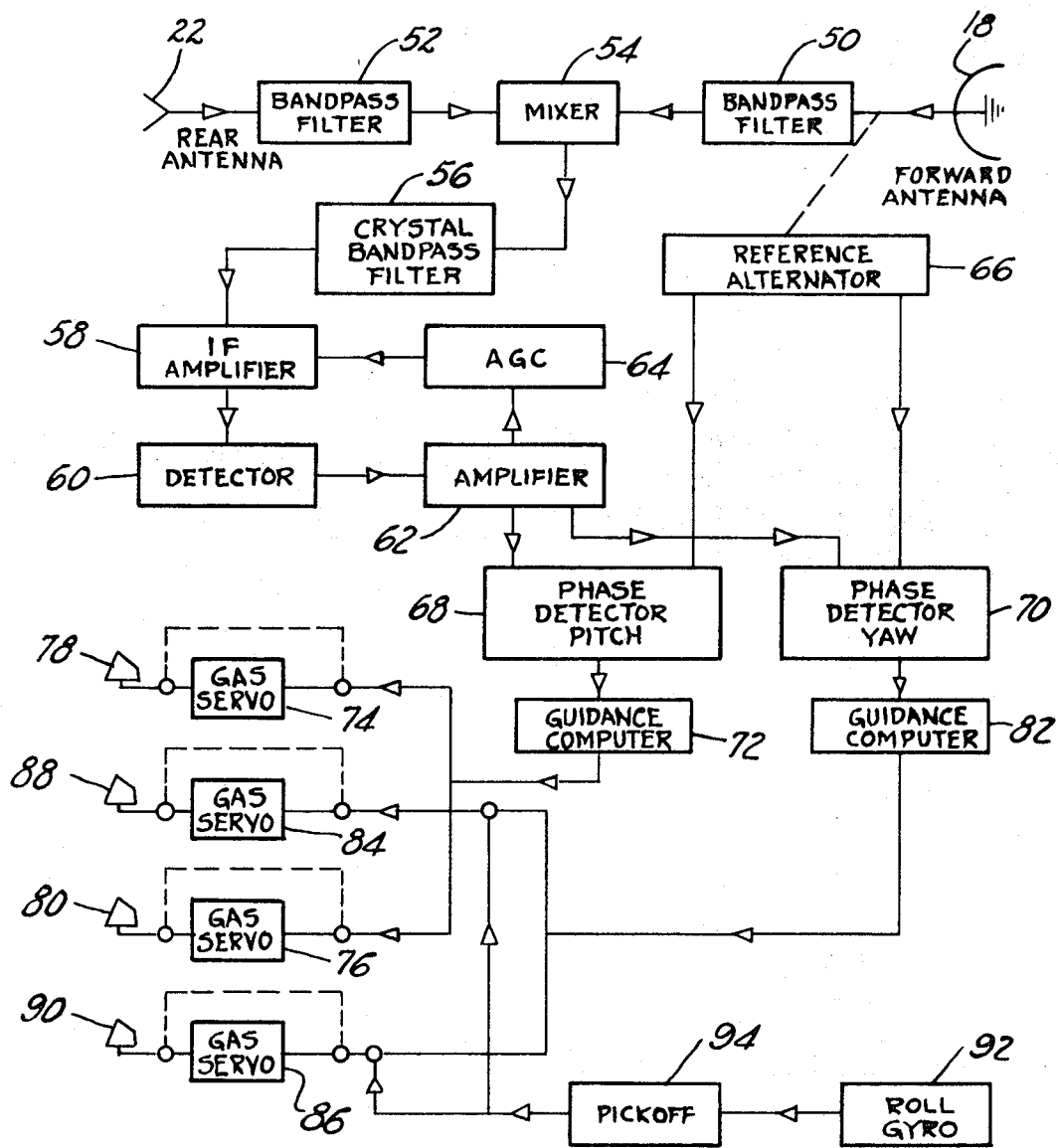
FIG. 4 is a block diagram of the part of the guidance system carried on the missile itself.

FIG. 3 provides a graphical representation of the relationship of the frequencies emitted by the illuminator antenna 14 and the modification of these frequencies due to Doppler effect as seen by the missile 20. On the top of the three horizontal axes are shown the two frequencies emitted by the illuminator antenna: the reference frequency ($f_o$) which may be of the order of 10,000 megacycles, and the target illuminator signal ($f_o+\delta f$) which may be approximately 1,060 mc. The signal $f_o$ is used as the missile reference signal at the rear antenna 22 and also serves as the missile local oscillator signal. The transmission of $f_o+\delta f$ is used for target illumination and the target reflected energy is received by the missile forward antenna 18. The frequencies seen at the missile are displaced because of Doppler effect an amount shown by the distance between the solid and dotted lines. Thus the solid line identified ($f_o-f_{dm}$) is the reference frequency displaced by the Doppler effect as seen at the rear antenna 22 of the missile and the solid line ($f_o+\delta f+f_{dm}+2f_{dt}$) is the target return frequency displaced by the Doppler effect of both the target and the missile as seen at the front antenna 18 of the missile. The frequency ranges shown on each side of the reference signal and target return lines indicate the band-pass characteristics of the band-pass filters 50 and 52 (See FIG. 4) used on the missile itself. As will be observed, the pass band of the rear antenna filter 52 has sharp cutoff characteristics and discriminates against frequencies which are passed by the filter 50 and vice versa. These two frequencies are heterodyned in the mixer 54 to produce a missile intermediate frequency of about 60 mc. The intermediate frequency signal at the output of the mixer 54 is filtered by a crystal filter 56 with a bandwidth of approximately 20 kc. at a center frequency of 60 mc. A typical tactical situation could result in missile target closing rate Doppler frequencies in the range of 40 to 60 kc. These numbers are derived by the previously assumed center frequency of operation producing a Doppler shift of 20 cycles per second per foot per second of closing velocity. Thus 40 kc. per second would correspond to a nominal missile velocity of 2,000 foot per second and 60 kc. would be produced by a direct closing target of 1,000 foot per second. Sharp pass band selectivity achievable with crystal filters makes it possible to ensure that clutter frequencies will not be passed by this filter. From FIG. 3 it will be seen that by correcting $\delta f$ as a function of missile speed, Doppler discrimination is achieved against sea clutter without the necessity for speed gate tracking in the missile.

The output of the crystal band-pass filter 56 is amplified in an intermediate frequency amplifier 58 and is then run through a detector 60 to a power amplifier 62. An automatic gain control circuit 64 connected between the power amplifier 62 and the intermediate frequency amplifier 58 provides a gain control for the system.

The forward antenna 18 is a conical scanning free gyro stabilized antenna designed to scan a cone of space symmetrical about the gyro axis. As the antenna scans the space ahead of the missile an amplitude modulation signal is imposed on the carrier frequency which provides target positional information relative to the gyro axis. Connected to the antenna 18 or its driving means is a reference alternator 66 which provides a phase reference signal to each of a pitch phase detector 68 and a yaw phase detector 70. Each of these circuits effects a comparison between the phase of the amplitude modulated signal transmitted by the power amplifier 62 and the phase reference signal from reference alternator 66. If the target were in substantial alignment with the missile gyro axis but above or below this axis the signal from the amplifier 62 would be out of phase to be passed by the yaw detector 70 but of such phase as to cause the pitch detector 68 to transmit a signal through a guidance computer 72 to the pitch control servos 74, 76 of such polarity as to move the corresponding pitch control surfaces 78, 80 in a direction to effect the desired correction. Similarly, if the missile were in alignment with the target as to elevation but was headed to the right or left, the signal from the amplifier 62 would not be transmitted by the pitch detector 68 but would be transmitted by the yaw detector 70 through the guidance computer 82 to the servos 84 and 86 to control the corresponding yaw control surfaces 88 and 90. The guidance computers 72 and 82 derive angular rate data and they therefore add a rate component to the output of the detectors 68 and 70 for stabilization. The guidance system is basically conventional so far as the scanning antenna, phase discrimination, and servo operation is concerned. The roll stabilization required is extremely coarse in nature, requiring only that excessive roll rate be prevented. A roll gyro 92, which may be a conventional gas driven gyro provides roll stabilization. Roll sensed by this gyro is converted to an electrical signal by means of a pickoff 94 which is connected to operate yaw control servos 84 and 86 differentially.

Operation of the above-described system may be best understood by considering a typical tactical situation. It will be assumed that the target 12 has been selected and is being followed by the tracking radar. The tracking radar provides target course information to the fire control computer. The illuminating antenna follows the tracking radar antenna and illuminates the target. Information from the fire control computer enables the missile 20 to be launched toward the target. During the initial or boost phase of the missile's journey control is entirely ballistic. At some predetermined time after launching the missile guidance system becomes actuated. The missile is launched on the basis of predicted target position at the end of this predetermined time such that it should be pointed directly at the target at the time the guidance system begins to operate. At such time the illuminating antenna is radiating a two frequency signal, one being the reference signal ($f_o$) and the other being the reference signal frequency plus the frequency output of the crystal oscillator as modified by the clutter control ($f_o+\delta f$). The rear antenna 22 receives both of these signals as modified by the Doppler effect caused by the missile's velocity, but due to the action of the band-pass filter 52 passes only frequencies in a band near ($f_o-f_{dm}$) and discriminates against the band of frequencies near the target return frequency. The scanning antenna, of course, receives the target return frequency ($f_o+\delta f+f_{dm}+2f_{dt}$) and imposes an amplitude modulation signal on this frequency which provides target positional information. After passing through the band-pass filter 50, this signal is mixed with the signal from the rear antenna to produce the amplitude modulated missile intermediate frequency which will be of the order of 60 mc. as corrected by the clutter control. Depending upon the value of this clutter control correction, the center frequency of the pass band passed by the crystal band-pass filter 56 will shift somewhat to avoid the sea clutter region as shown in FIG. 3. This modulated signal is then amplified, detected, and compared in the pitch and yaw detector circuits with the reference alternator output to provide correcting control signals to the control surface servos.

The above-described system provides for a considerably simplified electronic guidance system in the missile itself because of the two frequency illumination by the illuminating radar which makes it unnecessary for the missile to include an oscillator for generating the missile intermediate frequency. Those skilled in the art will recognize that such an oscillator operating in the frequency range contemplated and the environmental conditions of the missile itself, would necessarily be both costly and heavy enough to add appreciably to the weight of the missile borne guidance system. Because of the high power of the illuminator (over the range contemplated) and the narrow continuous wave Doppler, the system does possess certain electronic countermeasures (ECM) capabilities. In the event that ECM power levels exceed the normal signal ($f_o+\delta f+f_{dm}+2f_{dt}$), useable scan modulation will be generated from the ECM, mixing with the rear antenna signal ($f_o-f_{dm}$).

While only one embodiment has been shown and described herein, modifications may be made to suit specific applications without departing from the scope of the invention.

I claim:

1. In a guidance system for a missile, said system including an illuminating radar and its antenna and said missile including pitch and yaw control devices, a rear antenna and a front scanning antenna;

said illuminating radar including an oscillator for generating a high-frequency reference signal, a second oscillator for generating a second signal of lower frequency, a mixer for combining said second and said reference signals to produce a target illuminating signal, an amplifier for receiving and amplifying both of said reference and illuminating signals and means connecting said amplified signals to said illuminating antenna;

said missile including a first band-pass filter connected to said rear antenna adapted to pass a band of frequencies including the frequency of said reference signal as modified by the Doppler effect caused by the velocity of said missile and to discriminate against said target illuminating signal;

a second band-pass filter connected to said front scanning antenna adapted to pass a band of frequencies including the frequency of said target illuminating signal as modified by the Doppler effect caused by the velocity of said missile and said target and to discriminate against the band of frequencies passed by said first band-pass filter;

means operatively connected to said scanning antenna for imposing a modulation signal on the signal received by said scanning antenna, said modulation signal varying in phase depending upon the position of said target;

mixing and filtering means connected to said band-pass filters for producing a modulated intermediate frequency signal;

means for detecting and amplifying said modulated signal;

means producing an alternating current signal in phase with the movement of said scanning antenna;

and phase-responsive means for comparing said modulated signal with said alternating current signal for controlling the operation of said pitch and yaw control devices.

2. In a guidance system for a missile, said system including an illuminating radar and its antenna and said missile including pitch and yaw control devices, a rear antenna and a front scanning antenna;

said illuminating radar including means for generating a high-frequency reference signal, means for generating a second signal of lower frequency, a mixer for combining said second and said reference signals to produce a target-illuminating signal, means for receiving and amplifying both of said reference and illuminating signals and for connecting said amplified signals to said illuminating antenna;

said missile including a first band-pass filter connected to said rear antenna adapted to pass a band of frequencies including the frequency of said reference signal as modified by the Doppler effect caused by the velocity of said missile and to discriminate against said target-illuminating signal;

a second band-pass filter connected to said front scanning antenna adapted to pass a band of frequencies including the frequency of said target illumimating signal as modified by the Doppler effect caused by the velocity of said missile and said target and to discriminate against the band of frequencies passed by said first band-pass filter;

means operatively connected to said scanning antenna for imposing a modulation signal on the signal received by said scanning antenna, said modulation signal varying in phase depending upon the position of said target;

mixing and filtering means connected to said band-pass filters for producing a modulated intermediate frequency signal;

means for detecting and amplifying said modulated signal;

means producing an alternating current signal in phase with the movement of said scanning antenna;

and phase-responsive means for comparing said modulated signal with said alternating current signal for controlling the operation of said pitch and yaw control devices.

3. In a guidance system of the semiactive homing type for a missile having a front scanning antenna, a rear antenna and means for changing the yaw and pitch of said missile, said system including an illuminating antenna: an oscillator for generating a reference signal of high frequency, a second oscillator for generating a second signal of much lower frequency.

a mixer for combining said reference and said second frequencies to produce a target-illuminating signal having a frequency equal to the sum of said frequencies, an amplifier for receiving and amplifying both of said reference and illuminating signals, and means connecting said reference and illuminating signals to said illuminating antenna for radiating said signals in the direction of said missile and said target;

said missile carrying a first band-pass filter connected to said rear antenna adapted to pass a band of frequencies including the frequency of said reference signal modified by the Doppler effect caused by the velocity of said missile and to discriminate against said target-illuminating signal, a second band-pass filter connected to said front scanning antenna adapted to pass a band of frequencies including the frequency of said target illuminating signal as modified by the Doppler effect caused by the velocity of said missile and said target and to discriminate against the band of frequencies passed by said first band-pass filter, means operatively connected to said scanning antenna for imposing a modulation signal on the signal received by said scanning antenna, said modulation signal varying in phase in accordance with the position of said target, a mixer for receiving the outputs of said band-pass filters and heterodyning said signals to produce a modulated intermediate frequency signal, means for detecting and amplifying said modulated intermediate frequency signal, a reference alternator responsive to the movement of said front scanning antenna, a pitch phase detector and a yaw phase detector connected to said alternator and to said amplifying means such that modulation signals indicative of headings right or left of the target are of proper phase to be passed by said yaw detector to said yaw-changing means and signals indicative of headings above or below the target are of proper phase to be passed by said pitch detector to said pitch-changing means.

4. A guidance means as set forth in claim 3 wherein said system includes a tracking radar coordinated to move with said illuminating antenna and said tracking radar includes a fire control computer, said second oscillator includes means for varying its output frequency, and connections are provided from said fire control computer to said frequency varying means to vary the frequency output of said second oscillator with changes in the position of said target.

* * * * *